(12) United States Patent
Lee et al.

(10) Patent No.: US 6,970,223 B2
(45) Date of Patent: Nov. 29, 2005

(54) IN-PLANE SWITCHING MODE LCD DEVICE AND METHOD FOR FABRICATING THE SAME

(75) Inventors: Joun Ho Lee, Taegu-kwangyokshi (KR); Min Jie Lee, Taegu-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/441,066

(22) Filed: May 20, 2003

(65) Prior Publication Data

US 2004/0032557 A1 Feb. 19, 2004

(30) Foreign Application Priority Data

Aug. 17, 2002 (KR) ............................. P10-2002-0048656
Dec. 31, 2002 (KR) ............................. P10-2002-0087872

(51) Int. Cl.[7] ............................................. G02F 1/1343
(52) U.S. Cl. ........................ 349/141; 349/139; 349/154
(58) Field of Search ................................ 349/139, 141, 349/154

(56) References Cited

U.S. PATENT DOCUMENTS

| | | | | |
|---|---|---|---|---|
| 5,488,498 A | * | 1/1996 | Fujii et al. ................... | 349/149 |
| 5,598,285 A | | 1/1997 | Kondo et al. | |
| 5,745,207 A | * | 4/1998 | Asada et al. ................. | 349/141 |
| 5,838,037 A | | 11/1998 | Masutani et al. | |

(Continued)

FOREIGN PATENT DOCUMENTS

| | | | | | |
|---|---|---|---|---|---|
| JP | 05323336 A | * | 12/1993 | ......... | G02F/1/1341 |
| JP | 9-005764 | | 1/1997 | | |
| JP | 9-073101 | | 3/1997 | | |
| JP | 2001318386 A | * | 11/2001 | ......... | G02F/1/1341 |

OTHER PUBLICATIONS

Kiefer, et al., "In–Plane Switching of Nematic Liquid Crystals," *Japan Display*, 1992, pp. 547–550.

Oh–e, et al., "Principles and Characteristics of Electro–Optical Behavior with In–Plane Switching Mode," *Asia Display*, 1995, pp. 577–580.

Ohta, et al., "Development of Super–TFT–LCDs with In–Plane Switching Display Mode," *Asia Display*, 1995, pp. 707–710.

Matsumoto, et al., "Display Characteristics of In–Plane Switching (IPS) LCDs and a Wide–Viewing–Angle 14.5–in. IPS TFT–LCD," *Euro–Display*, 1996, pp. 445–448.

Wakemoto, et al., "38.1:An Advanced In–Plane–Switching Mode TFT–LCD," *SID 97 Digest*, 1997, pp. 929–932.

Lee, et al., "High–Transmittance, Wide–Viewing–Angle Nematic Liquid Crystal Display Controlled by Fringe–Field Switching," *Asia Display*, 1998, pp. 371–374.

*Primary Examiner*—Kenneth Parker
(74) *Attorney, Agent, or Firm*—McKenna Long & Aldridge LLP

(57) ABSTRACT

An In-Plane Switching (IPS) mode liquid crystal display device includes a first substrate, a plurality of gate lines on the first substrate along a first direction at a predetermined interval from each other, a plurality of data lines on the first substrate along a second direction substantially perpendicular to the first direction at a second predetermined interval from each other, a plurality of pixel regions defined by the crossing of the gate and data lines, a thin film transistor on the first substrate within each of the pixel regions, at least a common line on the first substrate parallel to the gate lines, a plurality of common electrodes connected to the common line within each of the pixel regions, a dummy data line on the first substrate substantially parallel to the data lines spaced apart from an outer most common electrode adjacent to a liquid crystal injection hole, and a plurality of pixel electrodes on the first substrate within each of the pixel regions, at least one of the pixel electrodes being connected to the thin film transistor.

26 Claims, 13 Drawing Sheets

U.S. PATENT DOCUMENTS

| | | |
|---|---|---|
| 5,946,060 A | 8/1999 | Nishiki et al. |
| 5,990,987 A | 11/1999 | Tanaka |
| 6,028,653 A | 2/2000 | Nishida |
| 6,097,454 A | 8/2000 | Zhang et al. |
| 6,266,166 B1 | 7/2001 | Katsumata et al. |
| 6,320,638 B1 * | 11/2001 | Youn .......................... 349/154 |
| 6,642,988 B2 * | 11/2003 | Matsuyama et al. ........ 349/156 |
| 6,693,687 B2 * | 2/2004 | Ohta et al. ................... 349/110 |
| 6,697,142 B2 * | 2/2004 | Ashizawa et al. .......... 349/141 |
| 2002/0008821 A1 * | 1/2002 | Lee et al. ................... 349/139 |
| 2002/0044246 A1 * | 4/2002 | Moon et al. ................ 349/141 |
| 2003/0058395 A1 * | 3/2003 | Hagiwara ................... 349/139 |

\* cited by examiner

IN-PLANE SWITCHING MODE LCD DEVICE AND METHOD FOR FABRICATING THE SAME

The present invention claims the benefit of Korean Patent Application No. P2002-48656 filed in Korea on Aug. 17, 2002 and Korean Patent Application No. P2002-87872 filed in Korea on Dec. 31, 2002, which are hereby incorporated by reference.

BACKGROUND OF THE INVENTION

1. Field to the Invention

The present invention relates to a liquid crystal display device and a method for fabricating the same, and more particularly, to an in-plane switching (IPS) mode liquid crystal display device and a method for fabricating the same.

2. Discussion of the Related Art

The vast development of information also increases the demands for the development of display devices. Recently, many efforts have been made to study and develop various types of flat display panel devices, such as liquid crystal display (LCD) devices, plasma display panel (PDP) devices, electro luminescent display (ELD) devices, and vacuum fluorescent display (VFD) devices. Some of these types of flat display panel devices have been applied in and incorporated into a range of devices. For instance, LCD devices have been widely used as substitutions for cathode ray tube (CRT) devices in mobile image displays because of their high quality image, light weight, small thickness, compact size and low power consumption. In addition, attempts have been made to incorporate LCD devices into image devices for receiving broadcasting signals, such as televisions and computer monitors. However, LCDs have not been as successfully incorporated into these image devices because the image quality has not been fully satisfactory. In order to implement an LCD device as a general display device, LCD development is dependent on realizing high image quality, high resolution, high luminance, and wide screen, while maintaining light weight, small thickness, compact size and low power consumption.

In general, an LCD device includes a liquid crystal display panel for displaying an image and a driving unit for applying a driving signal to the liquid crystal display panel. The liquid crystal display panel includes first and second glass substrates bonded to each other with a predetermined space therebetween, and a liquid crystal layer formed between the first and second glass substrates. The first glass substrate is commonly referred to as a thin film transistor (TFT) array substrate having a plurality of gate lines arranged along one direction at a predetermined interval from each other, a plurality of data lines arranged in a direction perpendicular to the gate lines at a predetermined interval from each other, a plurality of pixel electrodes formed in a matrix-arrangement within pixel regions defined by the gate and data lines crossing with each other, and a plurality of thin film transistors switched by signals of the gate lines to transfer signals of the data lines to the pixel electrodes. The second substrate is commonly referred to as a color filter substrate having a black matrix layer for cutting off light from a portion except in the pixel regions, an R/G/B color filter layer for producing colored light, and a common electrode for producing an image. However, in an in-plane switching (IPS) mode LCD device, the common electrode is formed on the first glass substrate. In addition, spacers are used to separate the first and second substrates from each other with the predetermined space therebetween, and a sealant is used to bond the first and second substrates to each other.

The liquid crystal layer may be formed in the liquid crystal display panel by employing a liquid crystal injection process. The liquid crystal injection process includes coating a sealant on one substrate to form an injection hole, bonding the substrate to a second substrate, evacuating the space between the bonded two substrates, injecting liquid crystal therein through the injection hole by osmotic pressure phenomenon, and sealing the injection hole with the sealant.

In general, an LCD device uses optical anisotropy and polarization properties of liquid crystal molecules to create images, and the liquid crystal molecules have a natural alignment order. In addition, the alignment order of the liquid crystal molecules can be altered by an electric field, such that the alignment order of the liquid crystal molecules changes as the direction of the electric field being applied to the liquid crystal molecules changes. Accordingly, by applying an electric field to the liquid crystal molecules, light incident on the liquid crystal molecules is then refracted by the changes in the alignment order of the liquid crystal molecules to thereby display images in the LCD device. In particular, in the liquid crystal layer, there are positive liquid crystal molecules with positive(+) dielectric anisotropy, and negative liquid crystal molecules with negative (−) dielectric anisotropy, such that a long axis of the positive liquid crystal molecules is arranged in parallel with a direction of an applied electric field, and a long axis of the negative liquid crystal molecules is arranged in perpendicular to the direction of the applied electric field.

FIG. 1 is a perspective view of an LCD device according to a related art. In FIG. 1, a first substrate 1, functioning as a thin film transistor array substrate, and a second substrate 2, functioning as a color filter array substrate, are bonded to each other with a predetermined space therebetween to form a liquid crystal display panel. A liquid crystal layer 3 is injected between the first and second substrates 1 and 2.

The first substrate 1 has a plurality of gate lines 4 arranged along one direction at a predetermined interval from each other, a plurality of data lines 5 arranged along a direction perpendicular to the gate lines 4 at a predetermined interval from each other, a plurality of pixel electrodes 6 formed in a matrix-arrangement within pixel regions P defined by the gate and data lines crossing with each other, and a plurality of thin film transistors T switched by signals of the gate lines 4 to transfer signals of the data lines 5 to the pixel electrodes 6. In particular, each thin film transistor T has a gate electrode projected from the gate line 4, an active layer formed on a gate insulating film (not shown), a source electrode projected from the data line 5, and a drain electrode opposite to the source electrode. Also, the pixel electrodes 6 are formed of a transparent conductive metal, such as indium-tin-oxide (ITO) having relatively high transmittance. Further, the second substrate 2 has a black matrix layer 7 for cutting off light from a portion except the pixel regions P, an R/G/B color filter layer 8 for producing colored light, and a common electrode 9 for producing an image.

Accordingly, the liquid crystal layer 3 on the pixel electrodes 6 is oriented in response to a signal provided from the thin film transistor T, and an amount of light transmitted through the liquid crystal layer 3 is controlled according to the orientation of the liquid crystal layer 3, thereby creating images. However, such driving of the liquid crystal layer provides images with a poor viewing angle.

FIG. 2 is a cross-sectional view of an IPS mode LCD device according to the related art, and FIGS. 3A and 3B are perspective views of the IPS mode LCD device in FIG. 2. In FIG. 2, an IPS mode LCD device has a first substrate 11 having a pixel electrode 12 and a common electrode 13 formed thereon. The first substrate 11 is bonded with a second substrate 15 with a predetermined space therebetween. A liquid crystal layer 14 operative by an in-plane electric field is formed between the first and second substrates 11 and 15.

In FIG. 3A, the IPS mode LCD device is at an OFF state in which no in-plane electric field is applied to the pixel electrode 12 or the common electrode 13. Thus, no phase change occurs in the liquid crystal layer 14. For example, the liquid crystal layer 14 is twisted to 45° from a horizontal direction of the pixel electrode 12 and the common electrode 13. In FIG. 3B, the IPS mode LCD device is at an ON state in which an in-plane electric field is applied to the pixel electrode 12 and the common electrode 13. Thus, a phase change occurs in the liquid crystal layer 14, such that the liquid crystal layer is twisted by 45° from the orientation in the OFF state shown in FIG. 3A to a direction the same with the pixel electrode 12 and the common electrode 13. The IPS mode LCD device has a wider viewing angle. For example, images created by the IPS mode LCD device can be watched at approx. 70° in up/down/left/right direction when seen from front. However, the IPS mode LCD device has poor transmittance and aperture ratio because the common electrode 13 and the pixel electrode 12 are on the same plane. Also, the IPS mode LCD device has a small misalignment margin of cell gaps, the device is required to have a shorter response time to a driving voltage, and uniform cell gaps.

FIG. 4 is a plan view of an IPS mode LCD device according to the related art, FIG. 5A is an enlarged plan view of 'A' of the IPS mode LCD device in FIG. 4, and FIG. 5B is a cross-sectional view of the IPS mode LCD device along I—I' in FIG. 5A. In FIG. 4, an IPS mode LCD device has an upper substrate 50 and a transparent lower substrate 60. A sealant material 55 is formed on either the upper substrate 50 or the lower substrate 60 for bonding the upper and lower substrates 50 and 60 to each other with a predetermined space therebetween. Also, the IPS mode LCD device includes a liquid crystal injection hole 56 for injecting liquid crystal material between the upper and lower substrates 50 and 60.

In FIG. 5A, the lower substrate 60 includes a plurality of gate lines 61 arranged along one direction at a predetermined interval from each other, a plurality of data lines 64 arranged along in a direction substantially perpendicular to the gate lines 61 at a predetermined interval from each other, and a plurality of pixel electrodes 66b formed within pixel regions defined by the gate and data lines 61 and 64 crossing with each other. In particular, each of the data lines 64 is bent at least once within each pixel region, thereby forming a zigzag pattern. In addition, a thin film transistor is formed in every pixel region. The thin film transistor includes a gate electrode 61a projected from the gate line 61, a gate insulating film 62 (shown in FIG 5B) on an entire surface, an active layer 63 formed on a gate insulating film 62 covering the gate electrode 61a, a source electrode 64a projected from the data line 64, and a drain electrode 66a formed as a unit with the pixel electrode 66b.

Further, a common line 61b and a plurality of common electrodes 61c are formed on a same layer with the gate lines 61, wherein the common line 61b crosses the pixel region in parallel with the gate line 61, and the common electrodes 61c are formed in a zigzag manner parallel to the data lines 64. The common electrodes 61c are symmetric with respect to the common line 61b. Also, the pixel electrodes 66b are formed in the zigzag manner parallel to and interposed between the common electrodes 61c in the pixel region. The pixel electrodes 66b are also symmetric with respect to the common line 61b. The pixel electrode 66b serves as the drain electrode 66a of the thin film transistor through a contact hole. In addition, the pixel electrode 66b extends to a top portion of a previous gate line to form a storage electrode 66c.

In FIG. 5B, a passivation layer 65 is formed on an entire surface of the lower substrate 60 above the gate insulating film 62 covering the data lines 64. Also, a black matrix 51, a color filter layer 52, and an overcoat layer 53 are formed on the upper substrate 50. In addition, the liquid crystal layer between each of the common electrodes 61c and an adjacent one of the pixel electrodes 66b is oriented in the same direction by an in-plane electric field applied between the common electrodes 61c and the pixel electrodes 66b, to form one domain. In particular, the IPS mode LCD device have a plurality of domains ①, ②, ③, and ④ within one pixel region, thereby providing images with a wide viewing angle. Further, the zigzag patterns of the common electrodes 61c and the pixel electrodes 66b facilitate an alignment direction of the liquid crystal layer within the pixel region in multiple directions, thereby allowing the multiple domains within one pixel region to have different alignment directions from each other.

However, in the IPS mode LCD device, when ion impurities are introduced into and accumulated in active lines (shown in FIG. 4) through the liquid crystal injection hole 56, a relatively high DC charge is generated. This accumulated charge is generated due to a difference in work functions between the metal and the transparent conductive material (ITO), i.e., the common line 61b and common electrode 61c and the pixel electrode 66b. Also, this charge increases the likelihood of trapping ions. Particularly, the last domain ④ has a larger DC charge compared to other domains. Unlike the other domains, the last domain ④ does not have a signal line on its right side and thus has more ions ⊖ trapped in its aperture region compared to the other domains. These trapped ions ⊖ cause a leakage in the colored light, e.g., a blue light, and the colored light leakage worsens at a low temperature when motions of the ions are slow. In addition, these trapped ions ⊖ cause an effective voltage in the last domain ④ to be different from other domains, thereby creating a different in luminance.

SUMMARY OF THE INVENTION

Accordingly, the present invention is directed to an array substrate for in-plane switching mode liquid crystal display device and a method of fabricating the same that substantially obviates one or more of problems due to limitations and disadvantages of the related art.

An object of the present invention is to provide an IPS mode LCD device which prevents color light leakage and a method for fabricating the device.

Another object of the present invention is to provide an IPS mode LCD device which prevents light leakage occurring at a low temperature and a method for fabricating the device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the In-Plane Switching (IPS) mode liquid crystal display device includes a first substrate, a plurality of gate lines on the first substrate along a first direction at a predetermined interval from each other, a plurality of data lines on the first substrate along a second direction substantially perpendicular to the first direction at a second predetermined interval from each other, a plurality of pixel regions defined by the crossing of the gate and data lines, a thin film transistor on the first substrate within each of the pixel regions, at least a common line on the first substrate parallel to the gate lines, a plurality of common electrodes connected to the common line within each of the pixel regions, a dummy data line on the first substrate substantially parallel to the data lines spaced apart from an outer most common electrode adjacent to a liquid crystal injection hole, and a plurality of pixel electrodes on the first substrate within each of the pixel regions, at least one of the pixel electrodes being connected to the thin film transistor.

In another aspect, the In-Plane Switching mode liquid crystal display device includes a substrate having an active region, a dummy region, and a pad region, a plurality of gate lines on the substrate along a first direction at a predetermined interval from each other, a plurality of data lines on the substrate along a second direction substantially perpendicular to the first direction at a second predetermined interval from each other, a plurality of pixel regions within the active region defined by the crossing of the gate and data lines, a plurality of pixel electrodes on the substrate within each of the pixel regions, a plurality of common electrodes on the substrate within each of the pixel regions, and a dummy data line in the dummy region parallel to the data lines, wherein the dummy data line connects to one of the data lines that is second data line adjacent to the dummy data line.

In another aspect, method for fabricating an in-plane switching mode liquid crystal display device includes forming a plurality of gate lines, a plurality of common lines, and a plurality of common electrodes on a substrate, forming a gate insulating film on the substrate including the gate lines, the common lines, and the common electrodes, forming a plurality of data lines and a dummy data line on the gate insulating film, forming a passivation layer on the substrate including the data line and the dummy data line, and forming pixel electrodes on the passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings.

Figure 1:
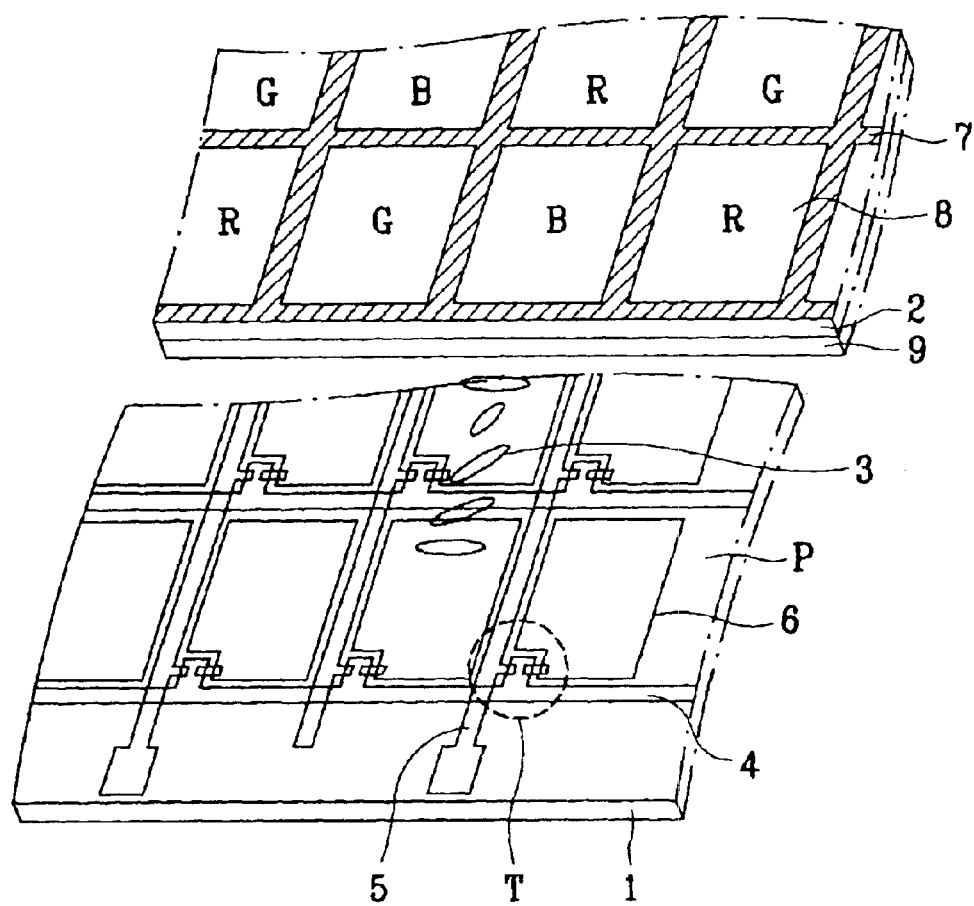
FIG. 1 is a perspective view of an LCD device according to a related art.
Figure 2:
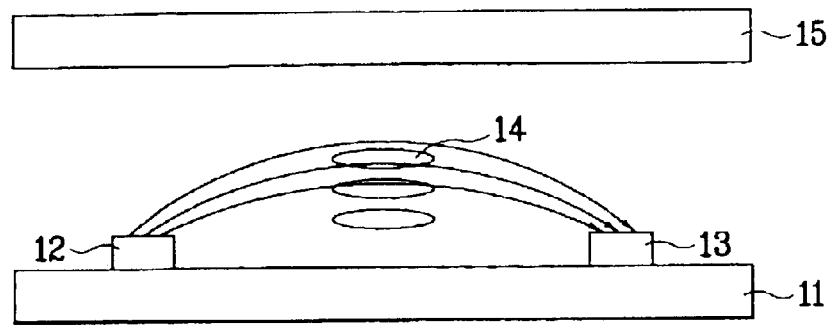
FIG. 2 is a cross-sectional view of an IPS mode LCD device according to the related art.
Figure 3A:
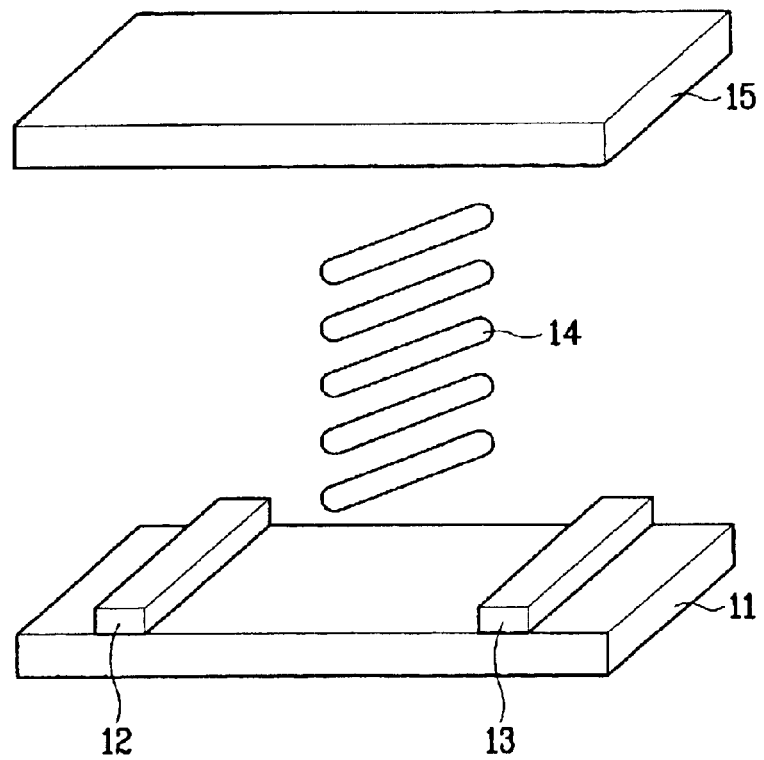
FIGS. 3A and 3B are perspective views of the IPS mode LCD device in FIG. 2.
Figure 3B:
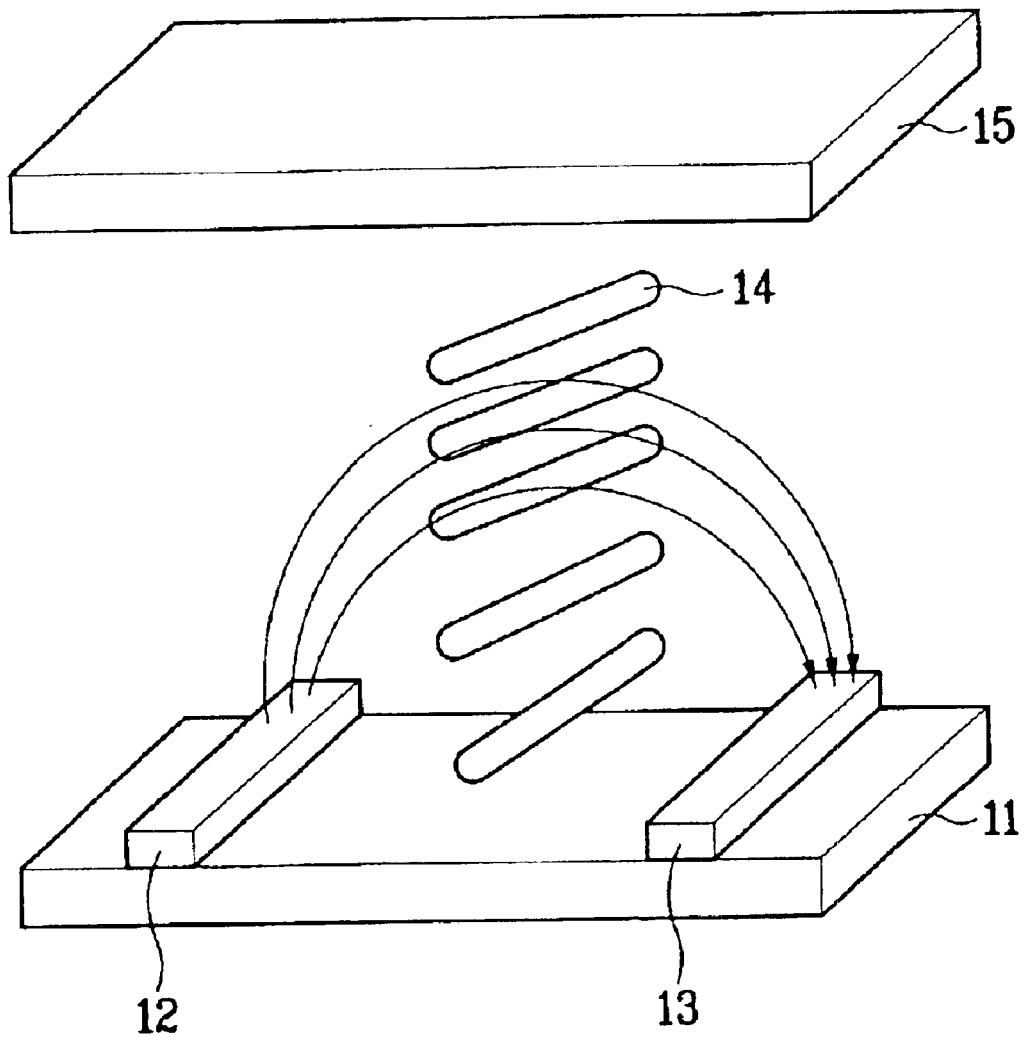
Figure 4:
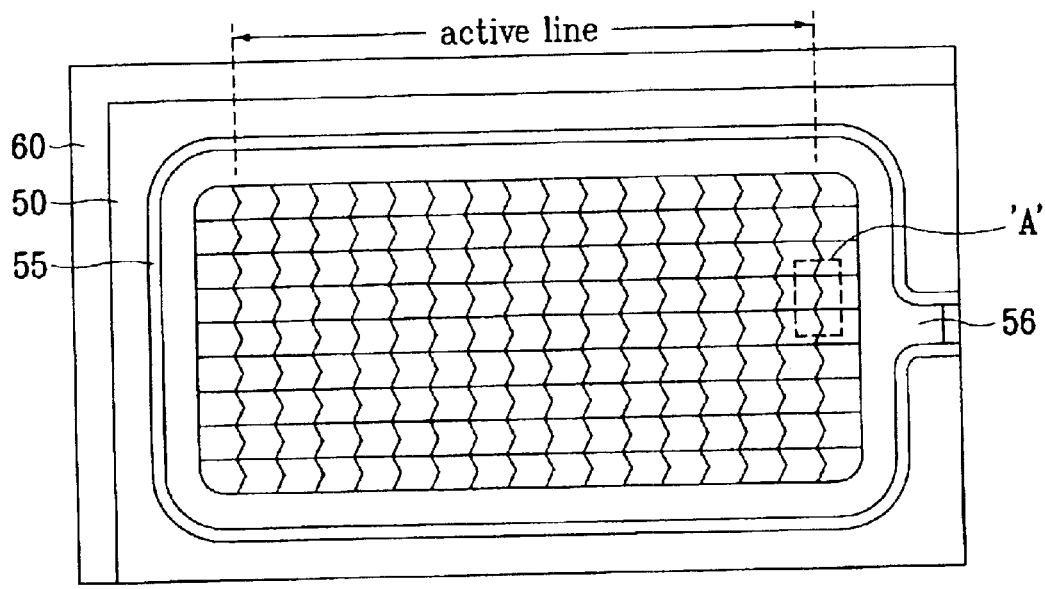
FIG. 4 is a plan view of an IPS mode LCD device according to the related art.
Figure 5A:
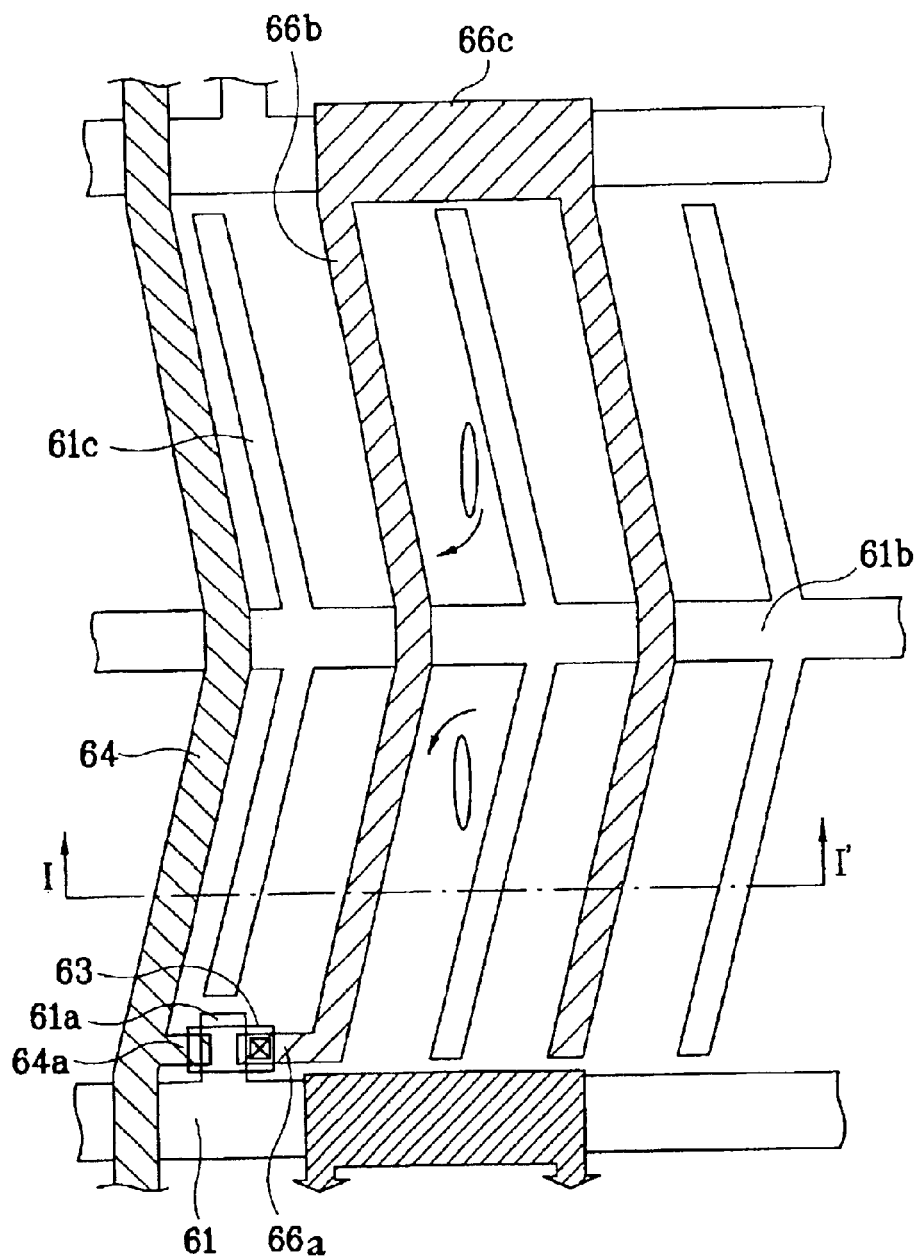
FIG. 5A is an enlarged plan view of 'A' of the IPS mode LCD device in FIG. 4.
Figure 5B:
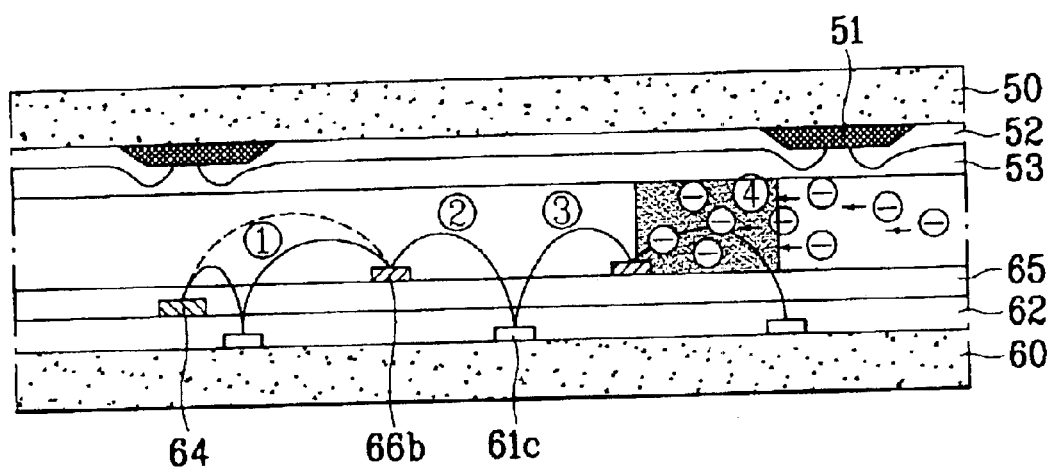
FIG. 5B is a cross-sectional view of the IPS mode LCD device along I–I' in FIG. 5A.
Figure 6:
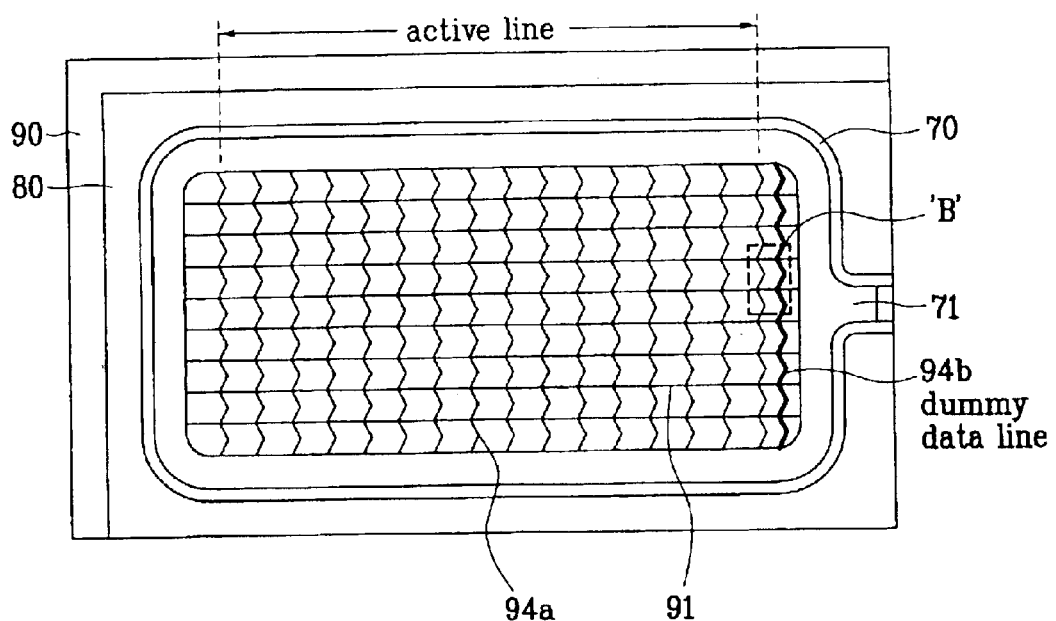
FIG. 6 is a plan view of an exemplary IPS mode LCD device according to the present invention.
Figure 7A:
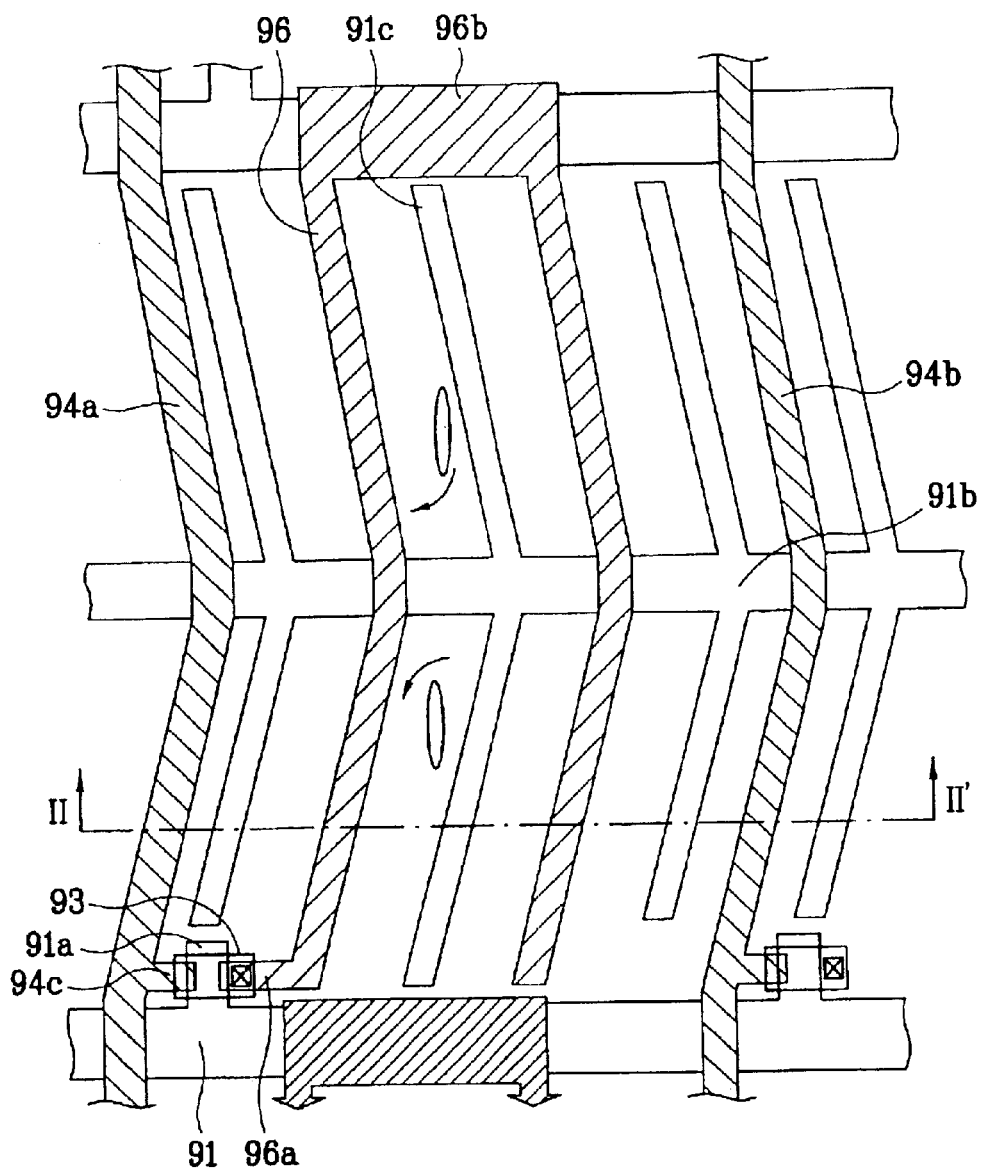
FIG. 7A is an enlarged plan view of 'B' of the IPS mode LCD device in FIG. 6 according to the present invention.
Figure 7B:
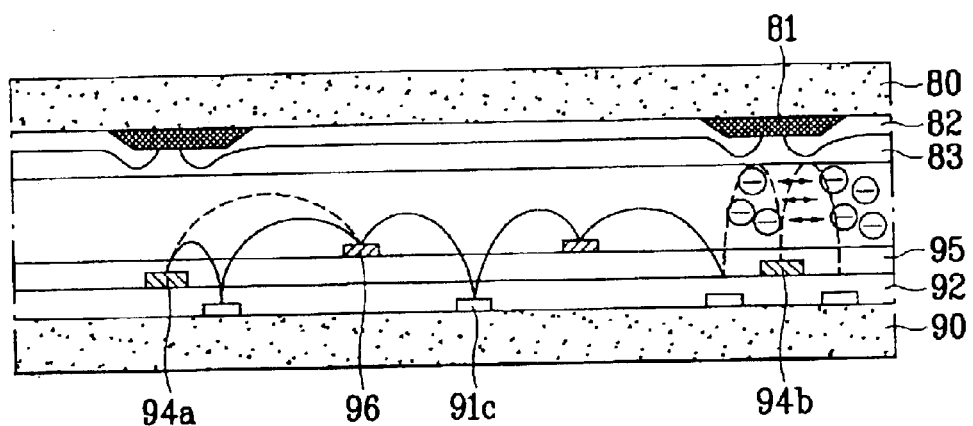
FIG. 7B is a cross-sectional view of the IPS mode LCD device along II–II' in FIG. 7A according to the present invention.

FIG. 6 is a plan view of an exemplary IPS mode LCD device according to the present invention, FIG. 7A is an enlarged plan view of 'B' of the IPS mode LCD device in FIG. 6 according to the present invention, and FIG. 7B is a cross-sectional view of the IPS mode LCD device along II—II' in FIG. 7A according to the present invention. In FIG. 6, an IPS mode LCD device may include an upper substrate 80 and a transparent lower substrate 90. A sealant material 70 may be formed on either the upper substrate 80 or the lower substrate 90 for bonding the upper and lower substrates 80 and 90 to each other with a predetermined space therebetween. Also, the IPS mode LCD device may include a liquid crystal injection hole 71 for injecting liquid crystal material between the upper and lower substrates 80 and 90. In addition, the lower substrate 90 may include a plurality of gate lines 91 arranged along one direction at a predetermined interval from each other, and a plurality of data lines 94a arranged along a direction substantially perpendicular to the gate lines 91 at a predetermined interval from each other. In particular, a dummy data line 94b may be formed on the lower substrate 90 as a non-active line immediately adjacent to the crystal injection hole 71.

In FIG. 7A, a plurality of pixel electrodes 96 may be formed on the lower substrate 90 within pixel regions defined by the gate and data lines 91 and 94a crossing with each other. In particular, the data lines 94a may be bent at least once within a pixel region. Although not shown, the data lines 94a may be bent more than once within a pixel region. Also, the dummy data line 94b may be bent and formed parallel to the data lines 94a. In addition, a thin film transistor may be formed within each pixel region. The thin film transistor may include a gate electrode 91a projected from the gate line 91, a gate insulating film 92 (shown in FIG. 7B) on an entire surface, an active layer 93 formed on the gate insulating film 92 covering the gate electrode 91a, a source electrode 94c projected from the data line 94a, and a drain electrode 96a formed as a unit with the pixel electrode 96.

Further, a common line 91b and a plurality of common electrodes 91c may be formed on a same layer with the gate lines 91 on the lower substrate 90. The common line 91b may be parallel to the gate lines 91 and cross the pixel region. The common electrodes 91c may be formed in a zigzag manner parallel to the data lines 94a within the pixel region. The common electrodes 91c may be symmetric with respect to the common line 91b and connected to each other. Alternatively, the common line 91b may be on an outer portion of the pixel region adjacent to the gate line 91 not crossing the pixel region (not shown), and the common electrode 91c would not be symmetric with respect to the common line 91b within the pixel region. Also, the pixel electrodes 96 may be formed in the zigzag manner parallel to and interposed between the common electrodes 61c in the pixel region. The pixel electrodes 96 may serve as the drain electrode 96a of the thin film transistor through a contact hole. In addition, the pixel electrodes 96 may extend to a top portion of a previous gate line to form a storage electrode 96b. The storage electrode 96b may be a hybrid storage (not shown) having both a Storage On Gate and a Storage On Common applied thereto.

FIG. 7B, a passivation layer 95 may be formed on an entire surface of the lower substrate 90 above the gate insulating film 92 covering the data lines 94a and the dummy data line 94b. Also, a black matrix layer 81, a color filter layer 82, and an overcoat layer 83 may be formed on the upper substrate 80. In addition, the liquid crystal layer between each of the common electrodes 91c and an adjacent one of the pixel electrodes 96 may be oriented in the same direction by the in-plane electric field applied between the common electrodes 91c and the pixel electrodes 96, to form one domain. In particular, the IPS mode LCD device may have a plurality of domains within one pixel region, thereby providing images with a wide viewing angle. Further, the zigzag patterns of the common electrodes 91c and the pixel electrodes 96 may facilitate an alignment direction of the liquid crystal layer within one pixel in multiple directions, thereby allowing the multiple domains within one pixel region to have different alignment directions from each other.

Moreover, when ion impurities are introduced into an active region inside of the active line (shown in FIG. 6) through the liquid crystal injection hole 71, and accumulated in the active region, a relatively high DC charge may be generated. Then, a voltage, which is higher than the signals in the common line 91b and the common electrodes 91c, may be applied to the dummy data line 94b. Thus, a positive potential well may be formed between the dummy data line 94b and the outer most common electrode 91c. Thus, ion impurities e would be attracted toward the positive potential well formed by the dummy data line 94b, thereby reducing the number of ion impurities ⊖ trapped in an aperture region in the active region. Accordingly, color light leakage is reduced. Further, when a certain amount of the ion impurities ⊖ are trapped within the positive potential well, a repelling⇌force would then be generated between these trapped ion impurities ⊖, such that the repelling force⇌is powerful enough to repel some of the ion impurities ⊖ outside of the active region.

In particular, each of the pixel electrodes 96 and the adjacent one of the common electrodes 91c may be spaced at least about 10 µm apart from each other. The dummy data line 94b and the outer most common electrode 91c may be spaced about 2~3 µm apart from each other to form a strong electric field between the dummy data line 94b and the outer most common electrode 91c, i.e., in a non aperture region, trapping more ion impurities e and preventing color light leakage. Accordingly, by having the dummy data line 94b in a region adjacent to the liquid crystal injection hole 71 outside of the active line, the introduction of the ion impurities ⊖ into the active line can be prevented.

Figure 8A:
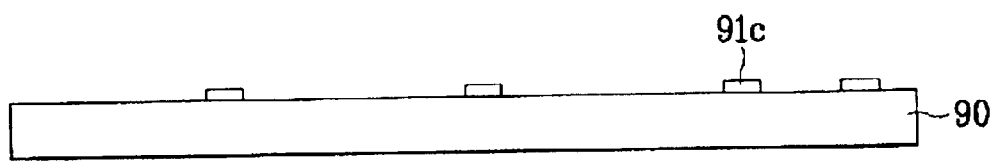
FIGS. 8A–8C are cross-sectional views of an exemplary IPS mode LCD device according to the present invention.
Figure 8B:
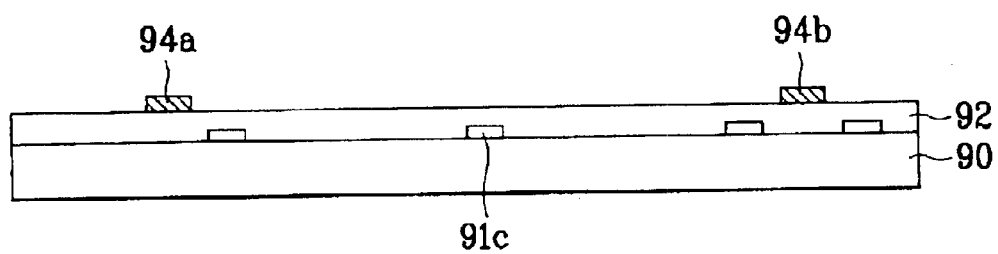
Figure 8C:
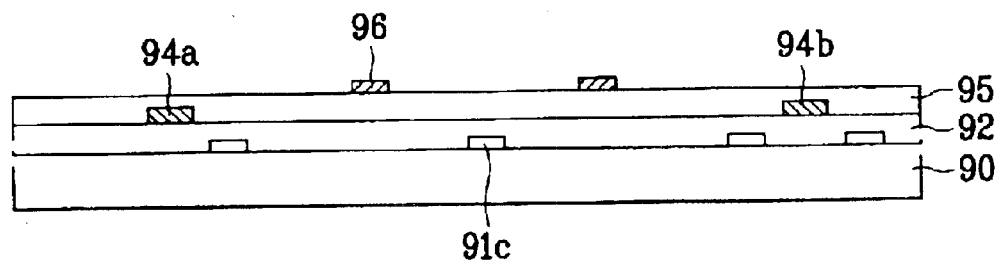

FIGS. 8A–8C are cross-sectional views of an exemplary IPS mode LCD device according to the present invention. In FIG. 8A, a conductive metal layer may be deposited on a transparent lower substrate 90. The conductive metal layer may include one of aluminum (Al), chromium (Cr), molybdenum (Mo), and tungsten(W). The conductive metal layer may then be patterned and etched by photolithography to form a plurality of gate lines 91 (shown in FIG. 7A) extended in one direction. A common line 91b (shown in FIG. 7A) and a plurality of common electrodes 91c may be simultaneously formed on a same layer with the gate lines 91. In particular, the common line 91b may be formed parallel to the gate lines 91, and a plurality of common electrodes 91c may be bent at least once within each pixel region defined by crossing of the gate lines 91 and a plurality of data lines 94a (shown in FIGS. 7A and 8B), thereby forming a zigzag manner. In addition, the common electrodes 91c may connect to each other through the common line 91b and be symmetric with respect to the common line 91b. Further, although not shown, a gate pad may be formed at an end of the gate lines 91, and the gate lines 91 may have a projection functioning a gate electrode 91a of a thin film transistor in each of pixel regions.

In FIG. 8B, a gate insulating film 92 may be formed on an entire surface of the lower substrate 90 at least covering the gate line 91 and the gate electrode 91a. The gate insulating film 92 may be one of silicon nitride (SiNx), and silicon oxide(SiO$_2$). Then, a semiconductor layer may be formed on the gate insulating film 92 and the semiconductor layer may include amorphous silicon and impurity amorphous silicon. The semiconductor layer may then be patterned and etched by photolithography to form an active layer 93 (shown in FIG. 7A) of an island form over the gate electrode 91a.

In addition, a second conductive metal layer may be deposited on an entire surface of the lower substrate 90 covering the active layer 93, and patterned and etched to form the data lines 94a in a direction substantially perpendicular to the gate lines 91 (shown in FIG. 6). The second conductive metal layer may simultaneously be patterned and etched to form source electrodes 94c projected from the data lines 94a and extended in one direction, and a data pad (not shown) at an end of each of the data lines 94a. In particular, the data line 94a may be bent at least once within each pixel region in a zigzag manner and parallel to the common electrodes 91c. Moreover, the second conductive metal layer may also be patterned and etched to form a dummy data line 94b outside an active region immediately adjacent to the liquid crystal injection hole 71 (shown in FIG. 6). The dummy data line 94b may be parallel to the data lines 94a and bent in the zigzag manner.

In FIG. 8C, an organic insulating material layer may be deposited on an entire surface of the lower substrate 90 covering the data lines 94a and the dummy data lines 94b, to form a passivation layer 95 for protecting the active layer 93 from external moist and foreign matters. The passivation layer 95 may include one of acryl, polyimide, Benzo Cyclo Butene (BCB), oxide, and nitride. Then, a portion of the passivation layer 95 may be removed to form a contact hole (shown in FIG. 7A) exposing a portion of the active layer 93. The contact hole may also expose portions of the gate pad and the data pad (not shown).

In addition, a third conductive metal layer may be deposited on an entire surface of the lower substrate 90 covering the contact hole. The third conductive material layer may be patterned and etched to form pixel electrodes 96 parallel to the common electrodes 91c and interposed between the common electrodes 91c. Also, the pixel electrodes 96 may be bent at least once within each pixel region in the zigzag manner and may be symmetric with respect to the common line 91b. Further, the pixel electrode 96 may extend to a top portion of a previous gate line to form a storage electrode 96b (shown in FIG. 7A). The storage electrode 96b may be a hybrid storage having both a Storage On Gate and a Storage On Common applied thereto.

Although not shown, an alignment layer may be formed on an entire surface of the lower substrate 90 covering the pixel electrodes 96, the common line 91b, and the common electrodes 91c. The alignment layer may include one of polyimide and a photo alignment material. The alignment layer of polyimide has an alignment direction fixed depending on mechanical rubbing, and a photo reactive material formed of a PVCN (polyvinylcinnamate based material) group material, or a polysiloxane based material has an alignment direction by irradiating a light, such as a UV light. The alignment direction depends on a direction of the light, or characteristics of the directed light, i.e., a polarization direction.

Then, an upper substrate 80 (shown in FIG. 7B) including a black matrix layer 81, a color filter layer 82, and an overcoat layer 83 formed thereon is provided. Alternatively, the overcoat layer may be omitted. In addition, a second alignment layer (not shown) may be provided on an entire surface of the upper substrate. A sealant 70 (shown in FIG. 6) may be formed on the lower substrate 90 or the upper substrate 80 for bonding the lower substrate 90 and the upper substrate 80 with a predetermined space therebetween.

Figure 9:
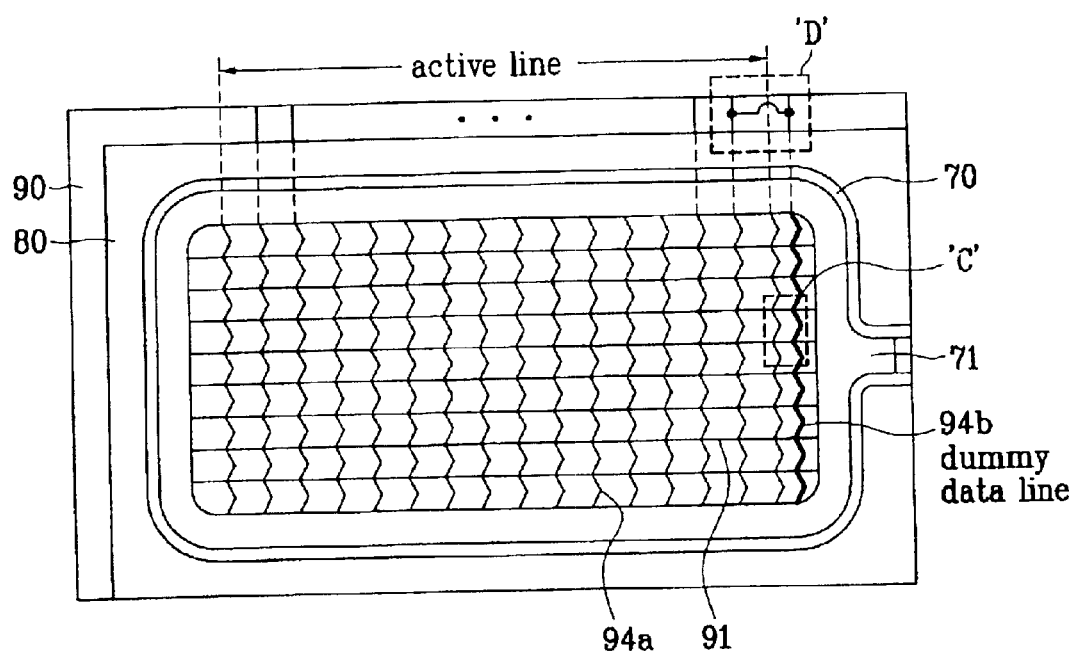
FIG. 9 is a plan view of another exemplary IPS mode LCD device according to the present invention.
Figure 10A:
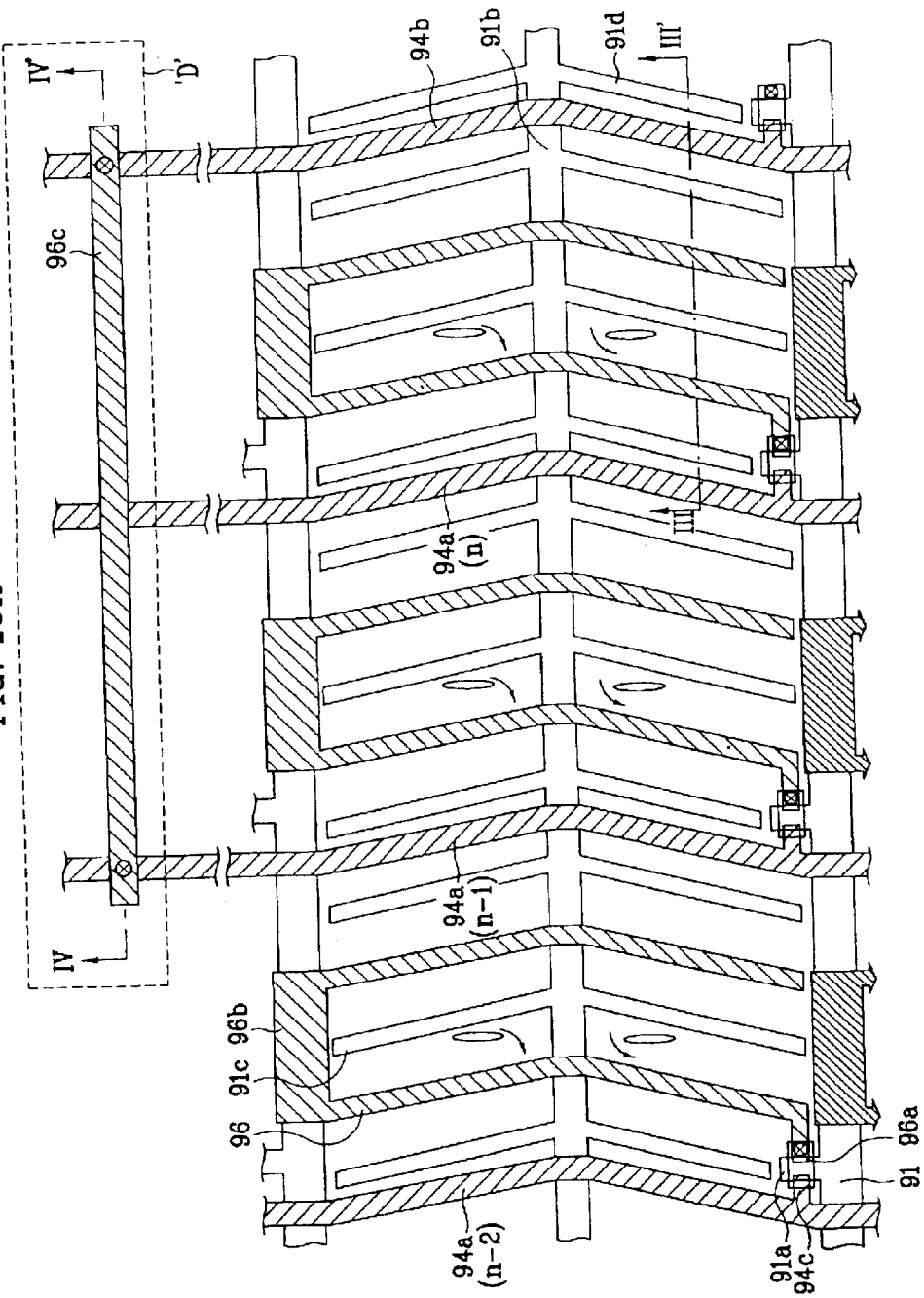
FIG. 10A is an enlarged plan view of 'C' of the IPS mode LCD device in FIG. 9 according to the present invention.
Figure 10B:
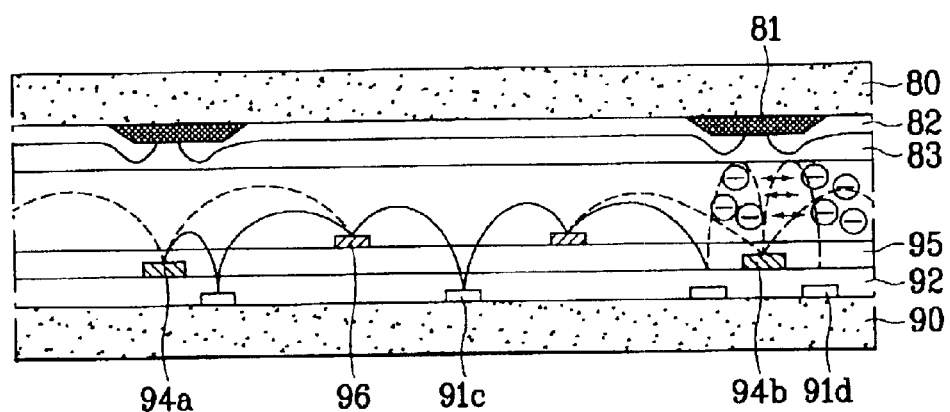
FIG. 10B is a cross-sectional view of the IPS mode LCD device along III–III' in FIG. 10A according to the present invention.
Figure 11:
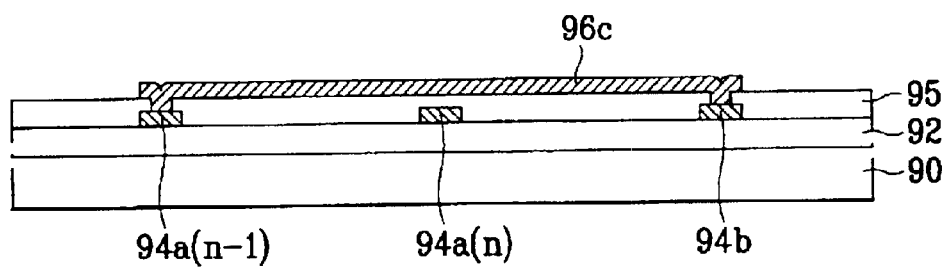
FIG. 11 is a cross-sectional view along IV–IV' in FIG. 10A according to the present invention.

FIG. 9 is a plan view of another exemplary IPS mode LCD device according to the present invention, FIG. 10A is an enlarged plan view of 'C' of the IPS mode LCD device in FIG. 9 according to the present invention, FIG. 10B is a cross-sectional view of the IPS mode LCD device along III–III' in FIG. 10A according to the present invention, and FIG. 11 is a cross-sectional view along IV–IV' in FIG. 10A according to the present invention. In FIG. 9, an IPS mode LCD device may include an upper substrate 80 and a transparent lower substrate 90. A sealant material 70 may be formed on either the upper substrate 80 or the lower substrate 90 for bonding the upper and lower substrate 80 and 90 to each other with a predetermined space therebetween. Also, the IPS mode LCD device may include a liquid crystal injection hole 71 for injecting liquid crystal material between the upper and lower substrate 80 and 90. In addition, the lower substrate 90 may include a plurality of gate lines 91 arranged along one direction at a predetermined interval from each other, a plurality of data lines 94a arranged along a direction substantially perpendicular to the gate lines 91 at a predetermined interval from each other. In particular, a dummy data line 94b may be formed on the lower substrate 90 as a non-active line immediately adjacent to the crystal injection hole 71. Moreover, one of the data lines 94a arranged immediately adjacent to the dummy data line 94b and the dummy data line 94b may be shorted at a pad region 'D.' For instance, a second data line 94a immediately adjacent to the dummy data line $94a_{(n-1)}$ may be shorted along with the dummy data line 94b at the pad region 'D.'

In FIG. 10A, a plurality of pixel electrodes 96 may be formed on the lower substrate 90 within pixel regions defined by the gate and data lines 91 and 94a crossing with each other. In particular, the data lines 94a maybe bent at least once within a pixel region. Although not shown, the data lines 94a may be bent more than once within a pixel region. In addition, a thin film transistor may be formed within each pixel region. The thin film transistor may include a gate electrode 91a projected from the gate line 91, a gate insulating film 92 (shown in FIG. 10B) on an entire surface, an active region formed on the gate insulating film 92 covering the gate electrode 91a, a source electrode 94c projected from the data line 94a, and a drain electrode 96a formed as a unit with the pixel electrode 96. Further, a common line 91b and a plurality of common electrodes 91c may be formed on a same layer with the gate lines 91 on the lower substrate 90. The common line 91b may be parallel to the gate lines 94 and cross the pixel region. The common electrodes 91c may be formed in a zigzag manner parallel to the data lines 94a within the pixel region. The gate lines 91, the common line 91b, the common electrodes 91c may be formed of a material including one of aluminum (Al), chrome (Cr), molybdenum (Mo), and tungsten (W). The gate insulating film 92 may be formed of a material including one of silicon nitride (SiNx) and silicon oxide ($SiO_2$).

In addition, the dummy data line 94b may be bent and formed parallel to the data line 94a, defining a dummy region. Also, elements may be arranged identically in the dummy region as those in the pixel regions, i.e., by arranging a dummy transistor, and a dummy common electrode 91d in an identical manner as the transistor and the common electrode 91b in the pixel region.

Further, a shorting bar 96c may be formed parallel to the common line 91b outside the pixel region. Moreover, the shorting bar 96c may be a transparent conductive film including a metal material or a same material as the pixel electrode 96. In particular, the dummy data line 94b and the second data line immediately adjacent to the dummy data line 94b, $94a_{(n-1)}$, may extend to the shorting bar 96c and may connect to the shorting bar 96c, such that the dummy line 94b and the second data line immediately adjacent to the dummy data line 94b, $94a_{(n-1)}$, may be shorted and a same signal would be applied the dummy line 94b and the second data line $94a_{(n-1)}$. Accordingly, the LCD panel may have identical polarity distribution through the panel, e.g., when operating in a dot inversion, a distribution of +−+−+−+, thereby avoiding residual DC in the active region and preventing light leakage. In particular, ions e confront a great barrier due to an electric field between the dummy data line 94b and the dummy common electrode 91d, thereby these ions ⊖ are blocked from the active region, thereby reducing trapping of ions ⊖. Further, since the dummy data line 94b is shorted with the second data line $94a_{(n-1)}$, only the data line immediately adjacent to the dummy data line 94b, $94a_{(n)}$ may sense distinctively different from the entire LCD panel.

In FIG. 10B, a passivation layer 95 may be formed on an entire surface of the lower substrate 90 above the gate insulating film 92 covering the data lines 94a and the dummy data line 94b. The passivation layer 95 may protect against external moisture or foreign matters, and may include one of acryl, polyimide, BCB, oxide, and nitride. Also, a black matrix layer 81, a color filter layer 82, and an overcoat layer 83 may be formed on the upper substrate 80.

In FIG. 11, the passivation layer 95 may then be patterned and etched to expose portions of the dummy data line 94b and the second data line immediately adjacent to the dummy data line 94b, $94a_{(n-1)}$. Then, the shorting bar 96c may be formed on the passivation layer 95 on the lower substrate 90 and connect to the exposed portions of the dummy data line 94b and the second data line $94a_{(n-1)}$ adjacent to the dummy data line 94b.

It will be apparent to those skilled in the art that various modifications and variations can be made in the array substrate for in-plane switching mode liquid crystal display device and the method for fabricating the same of the present invention covers the modifications and variations of this invention provided they come within the scope of the appended claims and their equivalents.

What is claimed is:

1. An In-Plane Switching mode liquid crystal display device, comprising:
   a first substrate;
   a plurality of gate lines on the first substrate along a first direction at a predetermined interval from each other;
   a plurality of data lines on the first substrate along a second direction substantially perpendicular to the first direction at a second predetermined interval from each other;
   a plurality of pixel regions defined by the crossing of the gate and data lines;
   a thin film transistor on the first substrate within each of the pixel regions;
   at least a common line on the first substrate parallel to the gate lines;
   a plurality of common electrodes connected to the common line within each of the pixel regions;
   a dummy data line on the first substrate substantially parallel to the data lines spaced apart from an outer most common electrode adjacent to a liquid crystal injection hole; and
   a plurality of pixel electrodes on the first substrate within each of the pixel regions, at least one of the pixel electrodes being connected to the thin film transistor,
   wherein the dummy data line receives a voltage higher than another voltage applied to the common electrodes.

2. The device as claimed in claim 1, wherein the common electrodes are bent at least once within each of the pixel regions.

3. The device as claimed in claim 2, wherein the common electrodes are bent in a zigzag-like manner.

4. The device as claimed in claim 1, wherein the data lines and the pixel electrodes are bent at least once within each of the pixel regions.

5. The device as claimed in claim 4, wherein the data lines and the pixel electrodes are bent in a zigzag-like manner.

6. The device as claimed in claim 1, wherein the common electrodes are symmetric with respect to the common line within each of the pixel regions.

7. The device as claimed in claim 1, wherein the common line is on an outer side of the pixel regions.

8. The device as claimed in claim 1, wherein the pixel electrodes extend to a portion on a gate line of an adjacent pixel region.

9. The device as claimed in claim 1, wherein the pixel electrodes and the common electrodes interpose between each other within each of the pixel regions.

10. The device as claimed in claim 1, wherein the dummy data line electrically connects to at least one of the data lines.

11. An In-Plane Switching mode liquid crystal display device, comprising:
    a first substrate;
    a plurality of gate lines on the first substrate along a first direction at a predetermined interval from each other;
    a plurality of data lines on the first substrate along a second direction substantially perpendicular to the first direction at a second predetermined interval from each other;
    a plurality of pixel regions defined by the crossing of the gate and data lines;
    a thin film transistor on the first substrate within each of the pixel regions;
    at least a common line on the first substrate parallel to the gate lines;
    a plurality of common electrodes connected to the common line within each of the pixel regions;
    a dummy data line on the first substrate substantially parallel to the data lines spaced apart from an outer most common electrode adjacent to a liquid crystal injection hole; and
    a plurality of pixel electrodes on the first substrate within each of the pixel regions, at least one of the pixel electrodes being connected to the thin film transistor, wherein the dummy data line electrically connects to only one of the data lines that is second data line adjacent to the dummy data line.

12. An In-Plane Switching mode liquid crystal display device, comprising:
    a substrate having an active region, a dummy region, and a pad region;
    a plurality of gate lines on the substrate along a first direction at a predetermined interval from each other;
    a plurality of data lines on the substrate along a second direction substantially perpendicular to the first direction at a second predetermined interval from each other;
    a plurality of pixel regions within the active region defined by the crossing of the gate and data lines;
    a plurality of pixel electrodes on the substrate within each of the pixel regions;
    a plurality of common electrodes on the substrate within each of the pixel regions; and
    a dummy data line in the dummy region parallel to the data lines, wherein the dummy data line connects to one of the data lines that is second data line adjacent to the dummy data line.

13. The device as claimed in claim 12, wherein the active region includes a thin film transistor within each of the pixel regions.

14. The device as claimed in claim 12, wherein the pad region includes:
    a gate insulating film on the substrate;
    n data lines on the gate insulating film and the dummy data line;
    a passivation layer on the substrate including the n data lines and the dummy data line;
    contact holes over the passivation layer to the $(n-1)^{th}$ data line and the dummy data line; and
    a shorting bar over the passivation layer between the contact holes and connecting to the $(n-1)^{th}$ data line and th dummy data line.

15. The device as claimed in claim 12, wherein the dummy region includes dummy thin film transistors, a dummy common line, dummy common electrodes, and dummy pixel electrodes.

16. The device as claimed in claim 12, wherein the pixel electrodes and the common electrodes have zigzag forms.

17. The device as claimed in claim 12, wherein the data lines have zigzag forms.

18. The device as claimed in claim 12, wherein the pixel electrodes extends to a gate line of a previous pixel region.

19. A method for fabricating an in-plane switching mode liquid crystal display device, comprising:
    forming a plurality of gate lines, a plurality of common lines, and a plurality of common electrodes on a substrate;

forming a gate insulating film on the substrate including the gate lines, the common lines, and the common electrodes;

forming a plurality of data lines and a dummy data line on the gate insulating film, the dummy data line being substantially parallel to the data lines and spaced apart from an outer most common electrode adjacent to a liquid crystal injection hole;

forming a passivation layer on the substrate including the data line and the dummy data line; and forming pixel electrodes on the passivation layer, wherein the dummy data line receives a voltage higher than another voltage applied to the common electrodes.

20. A method for fabricating an in-plane switching mode liquid crystal display device, comprising:

forming a plurality of gate lines, a plurality of common lines, and a plurality of common electrodes on a substrate;

forming a gate insulating film on the substrate including the gate lines, the common lines, and the common electrodes;

forming a plurality of data lines and a dummy data line on the gate insulating film;

forming a passivation layer on the substrate including the data line and the dummy data line;

forming pixel electrodes on the passivation layer; and forming a shorting bar connecting the dummy gate line to one of the data lines that is second immediately adjacent to the dummy data line.

21. The method as claimed in claim 20, wherein the shorting bar is formed on a same layer of the substrate as the pixel electrodes.

22. The method as claimed in claim 20, wherein the shorting bar is formed of a same material as the pixel electrodes.

23. The method as claimed in claim 19, wherein the common electrodes, the data lines and the dummy data line are formed bent at least once in a zigzag form.

24. The method as claimed in claim 19, wherein the pixel electrodes interpose between the common electrodes.

25. The method as claimed in claim 18, wherein the passivation layer is formed one of acryl, polyimide, BCB (Benzo Cyclo Butene), oxide, and nitride.

26. The method as claimed in claim 18, wherein the gate lines, the common lines, and the common electrodes are formed of a material including one of Al, Cr, Mo, and W.

* * * * *